Patented Mar. 29, 1932

1,851,082

UNITED STATES PATENT OFFICE

ROBERT BERLINER, OF LEVERKUSEN-ON-THE-RHINE, GERMANY, ASSIGNOR TO GENERAL ANILINE WORKS, INC., OF NEW YORK, N. Y., A CORPORATION OF DELAWARE

VAT DYESTUFFS OF THE ANTHRAQUINONE ACRIDONE SERIES

No Drawing. Application filed December 5, 1929, Serial No. 411,984, and in Germany December 12, 1928.

The present invention relates to new vat dyestuffs of the anthraquinone-acridone series.

In accordance with the invention new valuable dyestuffs of the anthraquinone-acridone series, more particularly dyestuffs of the probable general formula

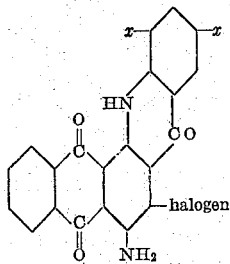

wherein $x$ means hydrogen or a halogen atom, at least one $x$ being a halogen atom, can be prepared by introducing one or two halogen atoms into the benzene ring of 4-amino-3-halogen-anthraquinone-1.2-acridone (obtainable, for example, by condensing 1-amino-2.4-dihalogen-anthraquinone with anthranilic acid, and subsequently treating the reaction product with strong sulfuric acid). My new compounds may be prepared according to various methods. For example, 4-amino-3-halogen-anthraquinone-1.2-acridones are treated with chlorine or gromine in nitrobenzene solution, whereby one or two halogen atoms may enter the benzene nucleus in the positions marked $x$ in the above formula.

The following is another method of preparing the new dyestuffs: 1-amino-2.4-dihalogenanthraquinone is condensed with a halogen-anthranilic acid or a suitable salt thereof, in the presence of a suitable high boiling organic solvent, such a nitrobenzene, naphthalene, etc. The reaction is performed while heating the reaction mixture, preferably in the presence of a suitable acid binding agent and of a catalytically acting substance, such as cupric chloride. The intermediate product thus formed (a 4-amino-3-halogen-anthraquinone-1-halogen-anthranilic acid) is treated with a suitable acid ring closing agent, such as concentrated sulfuric acid or chlorosulfonic acid, at normal or elevated temperature, whereby ring closure to the anthraquinone-acridone derivative is effected.

The products thus obtainable form bluish green crystals, soluble in strong sulfuric acid with orange to brown colorations, difficultly soluble in the usual organic solvents with blue to bluish-green colorations, dyeing cotton from an alkaline hydrosulfite vat bluish-green shades of good fastness properties.

The new dyestuffs have the advantage over the corresponding known dyestuffs not halogenated in the benzene ring of the acridone nucleus, of dyeing considerably more strongly with simultaneous displacement of the shades towards green. Furthermore, the new dyestuffs are fast to chlorine in spite of the free amino group.

The following examples illustrate my invention, without limiting it thereto:

Example 1

10 parts by weight of 1-amino-2.4-dibromo-anthraquinone are heated to boiling for about 4-5 hours with 14 parts by weight of potassium 2-amino-3.5-dichlorobenzoate in 200 parts by weight of cylcohexanol with the addition of 0.4 part by weight of cupric chloride. The condensation product soon begins to separate. When the condensation is complete, the mixture is diluted with alcohol, the potassium salt, which has precipitated, is filtered and boiled with dilute hydrochloric acid, thus yielding the free acid. 10 parts by weight of the dried halogen-anthraquinonyl-anthranilic acid are dissolved in 100 parts by weight of conc. sulfuric acid and the solution is heated to 90–100° C. The coloration of the solution, which is at first blue, soon changes to an orange red. On pouring the reaction mixture into water, the new dyestuff separates in greenish blue flakes, which can be recrystallized from nitrobenzene. It dyes cotton from a brown vat powerful bluish-green shades possessing satisfactory fastness properties as to chlorine. The dyestuff probably corresponds to the formula

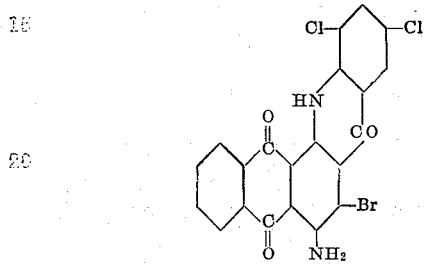

A similar dyestuff is obtained by the use of 1-amino-2.4-dichloro-anthraquinone instead of 1-amino-2.4-dibromoanthraquinone. Likewise, the ring closure can be carried out instead of with concentrated sulfuric acid with chlorsulfonic acid or with another suitable acid condensing agent.

*Example 2*

5 parts by weight of 4-amino-3-bromoanthraquinone-1.2-acridone are suspended in 100 parts by weight of nitrobenzene. A trace of iodine is added and thereafter a current of chlorine is passed through the mixture at a temperature between about 90–100° C. After some time the reaction product separates in the form of fine blue needles, which are filtered by suction and washed with alcohol. The new product thus obtainable dissolves in strong sulfuric acid with a yellowish-brown coloration; on pouring the sulfuric acid solution into water greenish-blue flakes are precipitated. The dyestuff dyes cotton from an alkaline hydrosulfite vat clear bluish-green shades of good fastness properties. The product corresponds to the following formula:

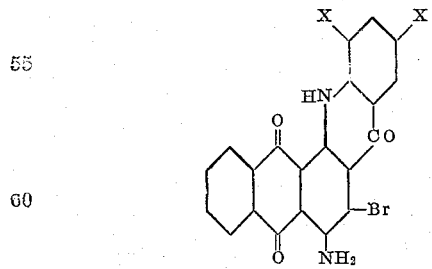

wherein one X stands for hydrogen and the other X for chlorine.

I claim:—
1. The products of the probable general formula

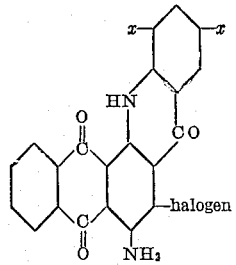

wherein $x$ means hydrogen or a halogen atom, at least one $x$ being a halogen atom, said products being bluish-green crystals soluble in strong sulfuric acid with orange to brown colorations, difficultly soluble in the usual organic solvents with blue to bluish-green colorations, dyeing cotton from an alkaline hydrosulfite vat bluish-green shades of good fastness properties as to chlorine.

2. The product of the probable formula

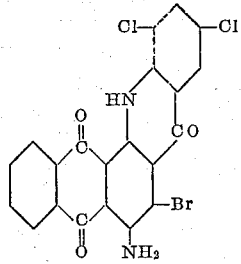

said product forming greenish-blue crystals, dyeing cotton from a brown hydrosulfite vat bluish-green shades of satisfactory fastness properties as to chlorine.

3. The product of the probable formula:

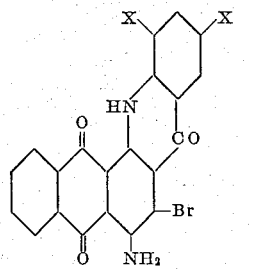

wherein one X stands for hydrogen and the other X for chlorine, the said product forming fine blue needles, dyeing cotton from an alkaline hydrosulfite vat clear bluish-green shades of good fastness properties as to chlorine.

In testimony whereof, I affix my signature.

ROBERT BERLINER.